Jan. 6, 1948.                G. S. BAYS                2,434,098
                    DENSITY INDICATING APPARATUS
            Filed Sept. 10, 1942            2 Sheets-Sheet 1
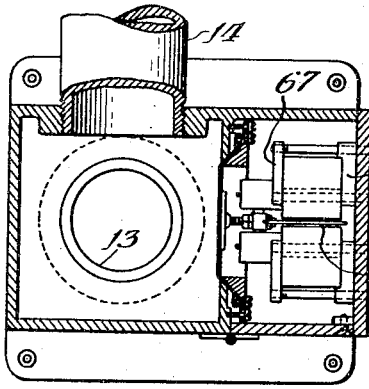
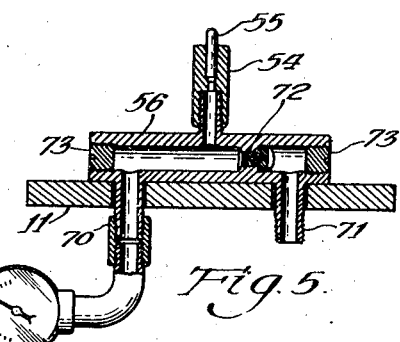
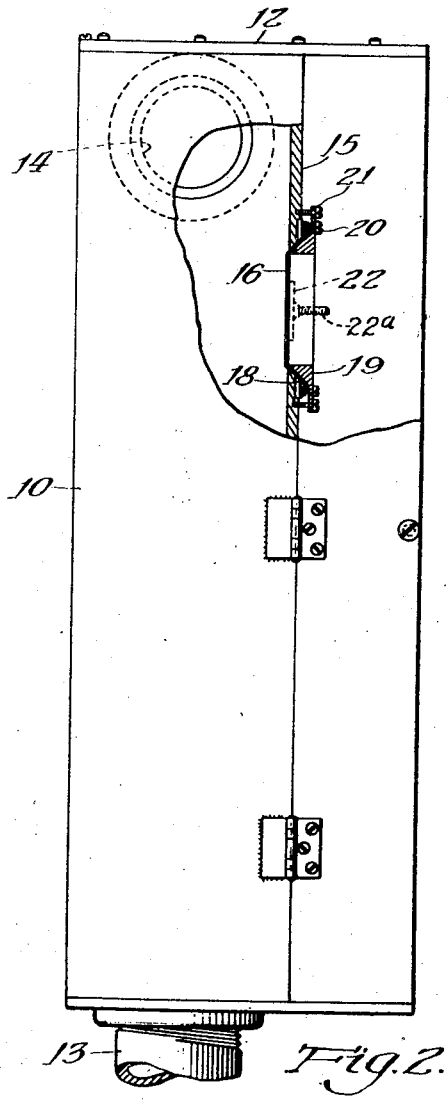
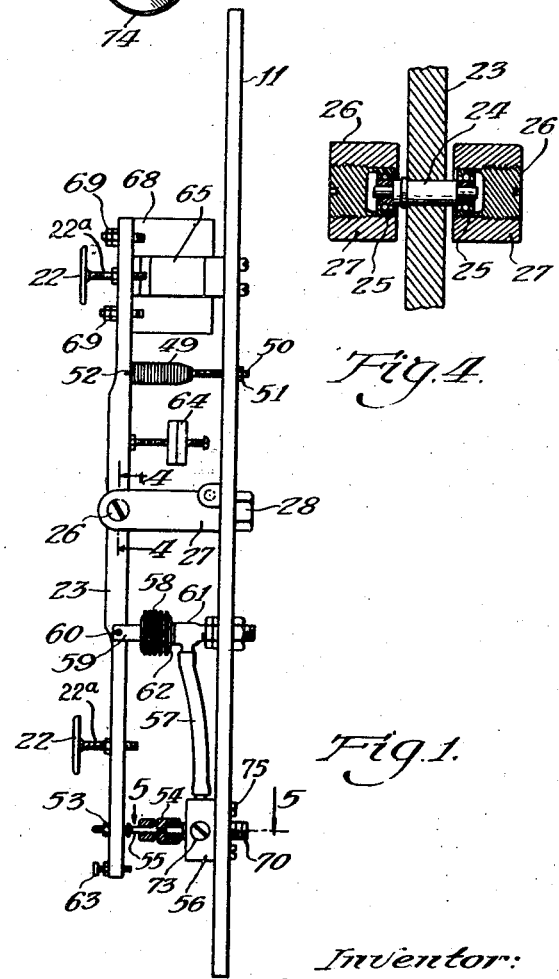
Inventor:
George S. Bays
By Everett A. Johnson
Attorney.

Jan. 6, 1948.   G. S. BAYS   2,434,098
DENSITY INDICATING APPARATUS
Filed Sept. 10, 1942   2 Sheets-Sheet 2

Inventor:
George S. Bays
By: Everett A. Johnson
Attorney:

Patented Jan. 6, 1948

2,434,098

UNITED STATES PATENT OFFICE 2,434,098

DENSITY INDICATING APPARATUS

George S. Bays, Tulsa, Okla., assignor to Stanolind Oil and Gas Company, Tulsa, Okla., a corporation of Delaware Application September 10, 1942, Serial No. 457,825

9 Claims. (Cl. 73—32)

This invention relates to apparatus for measuring density of fluids. More particularly it pertains to apparatus for continuously measuring density of flowing fluids such as drilling mud.

Density is one of the more important properties of drilling mud and should be carefully controlled. Ordinarily the density of a drilling mud is controlled by varying the proportion of solid to liquid in the mud mixture. If it is desired to increase the density, solid material is added. However, when density is too great in upper formations there can be serious loss of circulation and there can be excessive mud cake formed that can stick drill collars and can interfere with the running of the casing. The principal reason for increasing the density of a drilling mud is to prevent small but serious intrusions of gas, petroleum, or salt water or to protect against the possibility of a blowout due to high pressure fluids or heaving formations encountered in the drilling. When the density is too great, dilution with water will usually accomplish the desired reduction in density. In any event control of mud density requires very close attention because of the irregularities in mud properties resulting from wall scrapings, addition of water without measurement, addition of weighting material at a varying rate, dilution or flocculation of the mud by brines, and many other causes.

In using heavy muds the possibility of losing the mud to the surrounding formations is always present. When the pressures which the formation will stand have been determined, care must be exercised not to exceed this pressure. Often a variation of only 0.4 pound per gallon means the entrance of gas or salt water or the loss of mud returns. Under such conditions it is imperative that mud weight be known at all times.

The major item in the cost of drilling mud is the weighting material used and because of this every precaution should be taken to minimize unnecessary addition. A more uniform mud can be obtained more economically when the weighting material is added only to those increments of the drilling mud which are too light. Only by automatic density measuring and recording means can a non-uniform drilling mud be made uniform by adding weighting material or water to the light and heavy increments, respectively.

Thus by using automatic density measuring and recording devices the operator can avoid unnecessary increase in the cost of drilling, resulting either from excessive use of weighting materials or from drilling difficulties which can be overcome by the use of a proper and uniform drilling mud. For example, during a shutdown period an intrusion of gas may occur and be present for only a short part of the circulating period. Conventional methods involving grab sampling, i. e. the taking of random or intermittent samples, ordinarily will not detect the gas intrusion, but it is detected and recorded by the continuous density measuring method and apparatus. Then suitable corrective measures can be taken.

It is an object of my invention to provide a novel method and apparatus designed for the measurement of density of a flowing fluid. It is a further object to make a continuous measurement without impeding the flow of the material. Another object is to provide an apparatus for continuously measuring the density of flowing fluid which is simple in construction and operation. A further object is to provide an apparatus for continuously indicating the density of drilling mud which is both rugged for field work and sensitive enough to give an accurate indication of the condition of the drilling mud. These and other objects will become apparent as the description of the invention proceeds.

Broadly, the apparatus comprises a tank through which the material to be tested flows. On one side of the tank are two vertically spaced diaphragms which actuate a pivoted operating arm adapted to measure the pressure differential across the two diaphragms. This pressure differential is translated into mechanical motion which is indicated in terms of mud weight in pounds per gallon.

The following specification should be read in connection with the accompanying drawing wherein:

Figure 1 is a side view showing details of the operating assembly partly in section;

Figure 2 is a side view of the apparatus partly in section;

Figure 3 is a plan view of the apparatus partly in section;

Figure 4 is a section taken along the line 4—4 of Figure 1;

Figure 5 is a section taken along the line 5—5 of Figure 1; and

Figure 6:
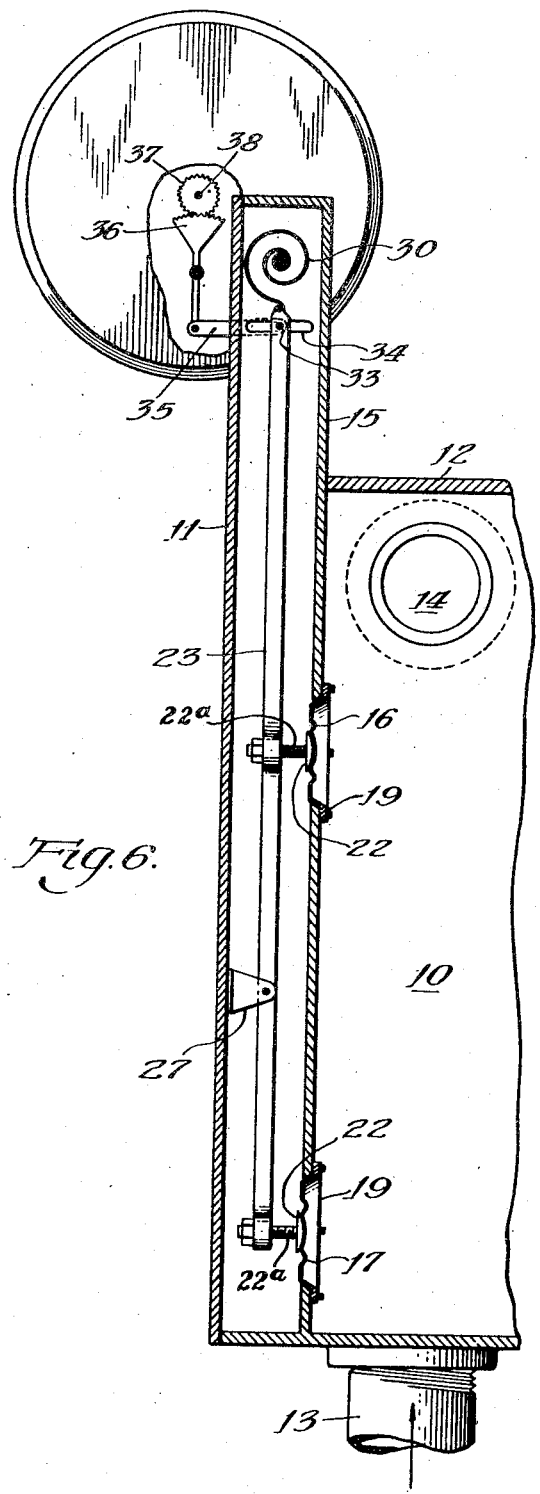
Figures 6 and 7 are sectional elevations of another embodiment of my apparatus.

Referring to the drawings, I have diagrammatically illustrated two embodiments of my invention in more or less detail. The apparatus comprises a tank 10 having case front 11 and case top 12. The material to be tested enters the tank 10 by inlet 13 and overflows through outlet 14 above the diaphragms. A wall or partition 15 of tank 10 is provided with vertically spaced diaphragms 16 and 17, the diaphragms 16 and 17 being held by diaphragm mounting plates 18 and diaphragm rings 19. The diaphragms 16 and 17 are held to diaphragm mounting plate 18 by means of machine screws 20, the entire diaphragm assembly being held by machine screws 21 to the partition 15. Diaphragm plates 22 are carried by adjustable elements 22a and the operating arm 23 which is mounted on arm shaft 24 midway between diaphragm plates 22. The arm shaft 24 terminates in bearings 25 which are adjustably held by bearing retainers 26 and is mounted in arm bearing pillow block 27 which in turn is held to case front 11 by element 28.

Figure 7:
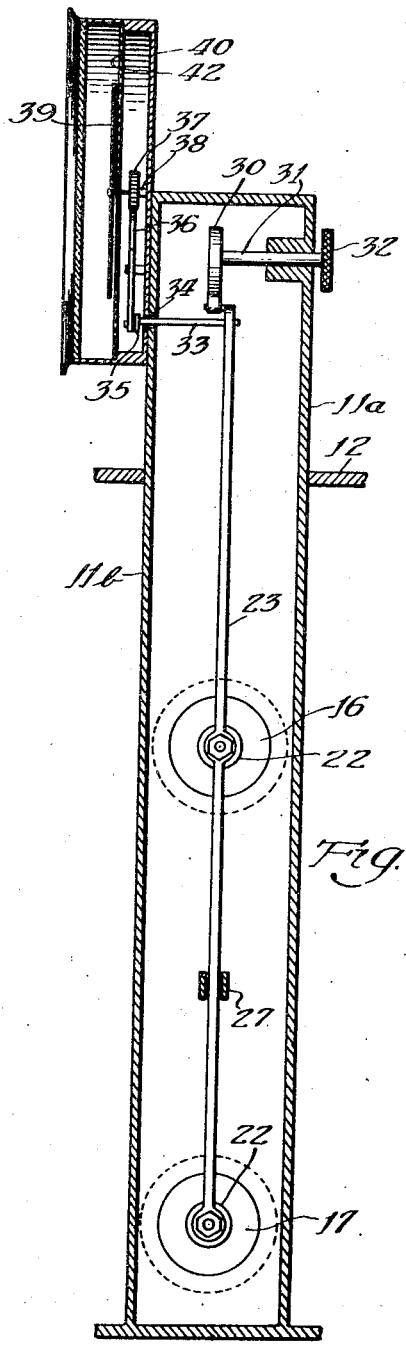

In the embodiment shown in Figures 6 and 7 an upper end of operating arm 23 is fixed to one end of a spiral spring 30. The other end of spring 30 is fixed to stem 31 which is adjustably mounted on the side wall 11a. Knob 32 is provided for turning stem 31 to adjust the tension in the spring 30 necessary to control the variations from a predetermined standard density to which the device is sensitive. A pin 33 is rigidly fixed to operating arm 23 and passes through slot 34 provided in sidewall 11b to permit lateral movement of the pin 33 in response to the deflection of operating arm 23. The outer end of pin 33 is pivotally attached to link 35 which is moveably fixed to quadrant gear 36. The teeth of the gear 36 are meshed with those of pinion 37 on the shaft 38 carrying indicator 39, said shaft 38 being supported within case 40. When the operating arm 23 is deflected from its initial position by the distension of the diaphragms 16 and 17 the quadrant gear 36 rotates the indicator 39. The indicator 39 moves over the dial face 42 and a recording means can be provided, if desired, for operation in a manner well known in the art. The greater the change in distending forces due to change in mud density, the greater will be the deflection of the operating arm 23. Thus by the use of two diaphragms, as illustrated, the change in density can be used to produce a visual indication thereof.

During the operation of this device, the diaphragms 16 and 17 are distended in amounts proportional to the hydrostatic heads of the columns of fluid within the tank above each diaphragm. Since the height of the fluid between the respective diaphragms remains constant, the distension of these diaphragms varies directly with the weight of the fluid per unit volume, or with specific gravity. The distension of the diaphragms 16 and 17 results in deflection of operating arm 23 about arm shaft 24. This deflection is transmitted as described above to produce a visual indication in the change in density of the flowing fluid.

Referring to Figure 1, a counterbalance spring 49 is fixed to case front 11 by flathead machine screw 50 and nut 51. The free end of the counterbalancing spring 49 is attached to operating arm 23 at 52. An extension of the lower end of operating arm 23 carries auxiliary bleed valve adjusting screw 53 which is brought up close to the auxiliary bleed valve 55 and the auxiliary orifice nozzle 54. Orifice header 56 communicates by means of flexible tubing 57 with bellows 58. One end of bellows 58 engages the operating arm 23 by means of bellows yoke 59 and Allen pivot screw 60. The other end is fastened to case front 11 by bellows mounting 61. Bellows gasket 62 is provided between mounting 61 and bellows 58.

The initial adjustment of the testing equipment is made by placing the apparatus of Figure 1 in the case illustrated in Figure 2, the case front 11 being fixed with respect to the tank wall 15. The diaphragm plates 22 are adjusted by elements 22a to contact diaphragms 16 and 17 without deflecting the diaphragms and stop spacer 63 is adjusted to limit the movement of the operating arm 23. The auxiliary bleed valve 54 then is adjusted by means of adjusting screw 53 to give the desired initial air pressure reading. Fine balancing adjustments of operating arm 23 are obtained through the use of counterbalance weights 64 and any tendency of the operating arm 23 to vibrate is controlled by a magnetic damper comprising magnets 65, magnet mounting 66 and magnet retainer 67. Damper vane 68 is fixed to operating arm by nuts 69, and cooperates with the magnets 65 in reducing the tendency of operating arm 23 to vibrate.

In operation at any instant after the tank 10 is full and overflowing, the diaphragms 16 and 17 are distended by amounts proportional to the hydrostatic heads of the columns of fluid within the tank at vertically spaced points. Since the height of the fluid between the respective diaphragms remains constant, the deflection of these diaphragms varies directly with the weight of the fluid per unit volume, or with specific gravity. Any deflection of the diaphragms 16 and 17 results in a differential motion of operating arm 23 about arm shaft 24 and a corresponding movement of the auxiliary bleed valve adjusting screw 53. Since the lower diaphragm 17 will always be subjected to a greater distending force than diaphragm 16, the tendency will be for the element 53 to close the auxiliary orifice nozzle 54. When an air supply under constant and sufficient pressure is supplied to orifice header 56, the bellows 58 will be extended until the operating arm 23 is moved back and the auxiliary orifice nozzle 54 is open to release the pressure sufficiently to attain a new equilibrium wherein the forces exerted by diaphragms 16 and 17 equal the counter force exerted by bellows 58. Consequently for every weight of fluid in tank 10 there will be a corresponding extension of bellows 58 and opening of orifice nozzle 54 with a resultant change in air pressure in air duct 70. When these air pressure changes are measured by a suitable and conventional pressure gauge 74 attached to the air duct 70, continuous visual indications of the specific gravity of the material flowing through the tank 10 will be obtained.

Figure 5 illustrates in greater detail the orifice header 56 of Figure 1. The orifice header 56 is mounted upon case front 11 by means of machine screws 75 and is provided with fluid supply line 71 and fluid duct 70 leading to the means represented by gauge 74 responsive to the pressure exerted on said bellows for producing a visual indication thereof. Between duct 70 and line 71 within the orifice header 56 is choke 72. The choke or header orifice 72 functions to supply a constant volume of gas to the header which escapes through the bleed valve 54 or actuates the bellows 58. The volume introduced is maintained constant regardless of small changes in back pressure since the linear rate of flow of the gas through the choke 72 into the header is at the speed of sound. The ends of orifice header 56 are sealed by means of flush type slotted pipe plugs 73. The orifice header 56 also communicates with bellows 58 by means of flexible tubing 57 as described above.

The apparatus which I have disclosed herein has many unique features which render it particularly useful for the intended purposes. The densimeter described provides diaphragm means for continuously measuring the density of a flowing fluid without an appreciable stretching or distension of the diaphragms. This is advantageous because the distension of the diaphragm is within the range wherein the deflection is a linear function of the force applied, thereby giving accurate and reproducible readings. The small deflection is made possible by providing the bellows arranged to oppose the deflection of the diaphragm. The small deflections of the diaphragms are multiplied by the variable orifice apparatus into which air is introduced under constant pressure. For every weight of fluid column in the flow chamber, there is a corresponding deflection of the diaphragms, opening of the bleed valve, and change in air pressure. The apparatus is also adjustable for any initial density, for example, of drilling mud. Thus the measured changes in density are automatically compared with a fluid of known density. Another feature of the apparatus is the design of the diaphragms. The diaphragms are flat and are scoured by the flowing fluid thereby preventing accumulation of muds and the like upon the diaphragm faces. It is apparent that when such accumulation occurs accurate measurement of the variation in density is not possible.

It will be apparent from the above that I have attained the objects of my invention and have provided a ready method and apparatus for continuously indicating the density of flowing fluids, such as drilling muds, without interrupting the stream flow.

While I have illustrated and described preferred embodiments of my invention it should be understood that the invention is not limited to any illustrated detail but only as defined by the following claims.

I claim:

1. An apparatus for measuring density of flowing fluids comprising a flow chamber having an inlet and an outlet at vertically spaced points, an upper and a lower pressure responsive means in the wall of said flow chamber at vertically spaced points between said inlet and outlet, operating means exterior of chamber extending between said pressure responsive means, pivoted means for supporting said operating means at a point between said pressure responsive means, rigid adjustable means carried by said operating means adapted to contact said pressure responsive means, said operating means being adapted to be deflected from the initially adjusted position a distance proportional to the differential of the pressure applied to said pressure responsive means, and adjustable means tending to counterbalance the deviation of the pressure responsive means and said operating means from a balanced state.

2. An apparatus for measuring density of flowing fluids comprising a flow chamber having an inlet and an outlet, an upper and lower pressure responsive means forming a part of the wall of said chamber and exposed directly to the fluids within said flow chamber, pivoted operating means exterior of said chamber extending between said pressure responsive means and in operative relation thereto, means adjustably fixed to said pivoted operating means adapted to contact said pressure responsive means and for initially balancing said operating means, said operating means being adapted to be deflected from the initially balanced position a distance proportional to the differential of the pressures applied to said pressure responsive means.

3. An apparatus for measuring density of flowing fluids comprising a flow chamber having an inlet and an outlet, an upper and a lower pressure responsive means in a wall of said chamber and exposed to the fluids flowing between said inlet and outlet, pivoted operating means exterior of said chamber, pivot means for supporting said operating means between said upper and lower pressure responsive means, adjustable rigid follower means fixed to said operating means and adapted adjustably to contact said pressure responsive means, said operating means being adapted to be deflected from an initially balanced position a distance proportional to the differential of the movement of said pressure responsive means, and means arranged to oppose the deflection of said operating means.

4. An apparatus for measuring density of flowing fluids comprising a flow chamber having an inlet and an outlet, an upper and a lower pressure responsive means positioned in the wall of the flow chamber and exposed to the fluids flowing between said inlet and outlet, pivoted operating means exterior of said chamber, pivot means for supporting said operating means between said upper and lower pressure responsive means, adjustable rigid follower means fixed to said operating means and adapted adjustably to contact said pressure responsive means, said operating means being adapted to be deflected from an initially balanced position a distance proportional to the differential of the movement of said pressure responsive means, a fluid pressure means arranged to oppose the deflection of said operating means and means carried by said operating means for controlling the pressure exerted on said fluid pressure means.

5. An apparatus for measuring density of flowing fluids comprising a flow chamber having an inlet and an outlet, an upper and a lower pressure responsive means in a wall of said chamber and exposed to the fluids flowing between said inlet and outlet, pivoted operating means exterior of said chamber, pivot means for supporting said operating means between said upper and lower pressure responsive means, adjustable rigid follower means fixed to said operating means and adapted adjustably to contact said pressure responsive means, said operating means being adapted to be deflected from an initially balanced position a distance proportional to the differential of the movement of said pressure responsive means, and spring means arranged to oppose the deflection of said operating means and means responsive to the deflection of the said operating means for producing a visual indication thereof.

6. An apparatus for measuring density of flowing fluids comprising a vertically elongated flow chamber having an inlet and an outlet, upper and lower diaphragms in a wall of said chamber and exposed to the fluids flowing between said inlet and outlet, a pivoted bar exterior of said chamber, pivot means for supporting said bar between said upper and lower diaphragms, adjustable rigid means carried by said bar adapted to contact said diaphragms and to actuate said bar in accordance with the relative position of said diaphragms, spring means arranged to oppose the deflection of said bar and means actuated by said bar for producing a visual indication of the deflection thereof.

7. An apparatus for measuring density of flowing fluids comprising a vertically elongated flow chamber having an inlet and an outlet, upper and lower diaphragms positioned in the wall of the flow chamber and exposed to the fluids flowing between said inlet and outlet, a pivoted bar exterior of said chamber, pivot means for supporting said pivoted bar between said upper and lower diaphragms, adjustable rigid follower means fixed to said bar and adapted adjustably to contact said diaphragms, said bar being adapted to be deflected from an initially balanced position a distance proportional to the differential of the movement of said diaphragms, a bellows arranged to oppose the deflection of said bar and means carried by said bar for controlling the pressure exerted on said bellows.

8. An apparatus for measuring density of flowing fluids comprising a flow chamber having an inlet and an outlet, upper and lower pressure responsive means arranged between said inlet and outlet in a wall of said chamber and exposed to the fluids within the flow chamber, pivoted bar means exterior of said chamber, pivot means for supporting said bar means between said upper and lower pressure responsive means, adjustable rigid follower means fixed to said bar means and adapted adjustably to contact said pressure responsive means, said bar means being adapted to be deflected from an initial balanced position, a fluid bellows arranged to oppose the deflection of the pivoted bar means and means carried by said pivoted bar means for controlling the pressure exerted on said bellows.

9. An apparatus for indicating density of fluids comprising a flow chamber having inlet and outlet means, upper and lower pressure responsive means arranged in a wall of said chamber and exposed to the fluids within said chamber, pivoted bar means exterior of said chamber, pivot means for supporting said bar means between said upper and lower pressure responsive means, adjustable rigid follower means fixed to said bar means and adapted adjustably to contact said pressure responsive means, said bar means being adapted to be deflected from an initially balanced position, restraining means arranged to oppose the deflection of said bar means, and indicating means responsive to a change in position of said bar means.

GEORGE S. BAYS.

REFERENCES CITED

The following references are of record in the file of this patent:

UNITED STATES PATENTS

| Number | Name | Date |
| --- | --- | --- |
| 2,115,520 | Decker | Apr. 26, 1938 |
| 1,319,241 | Nassen | Oct. 21, 1919 |
| 1,605,171 | Chance | Nov. 2, 1926 |
| 1,686,688 | Fechheimer | Oct. 9, 1928 |
| 1,838,399 | Hodgson | Dec. 29, 1931 |
| 2,023,568 | Albersheim et al. | Dec. 10, 1935 |
| 2,056,187 | Hay | Oct. 6, 1936 |
| 2,223,712 | Ziebolz | Dec. 3, 1940 |
| 2,235,064 | Cloud | Mar. 18, 1941 |
| 1,822,458 | Rowland et al. | Sept. 8, 1931 |
| 2,137,843 | Jennings | Nov. 22, 1938 |
| 1,621,535 | Haultain | Mar. 22, 1927 |
| 1,697,867 | Haultain | Jan. 8, 1929 |
| 2,248,322 | Annin | July 8, 1941 |

FOREIGN PATENTS

| Number | Country | Date |
| --- | --- | --- |
| 45,494 | Austria | Jan. 10, 1911 |
| 421,668 | Great Britain | Dec. 28, 1934 |